United States Patent [19]

Thayer

[11] 4,265,736

[45] May 5, 1981

[54] PROCESS AND APPARATUS FOR REDUCING THE ENERGY REQUIRED TO SEPARATE LIQUIDS BY DISTILLATION

[76] Inventor: Victor R. Thayer, 1251 Corner Ketch Rd., Newark, Del. 19711

[21] Appl. No.: 82,990

[22] Filed: Oct. 9, 1979

Related U.S. Application Data

[63] Continuation-in-part of Ser. No. 960,577, Nov. 14, 1978, abandoned.

[51] Int. Cl.³ .......................... B01D 3/00; C10G 7/00
[52] U.S. Cl. .................................... 208/353; 196/120; 202/158; 202/159; 203/22
[58] Field of Search ................ 196/120; 202/159, 158; 203/22; 208/353

[56] References Cited

U.S. PATENT DOCUMENTS

| | | | |
|---|---|---|---|
| 2,183,094 | 12/1939 | Fenske et al. | 208/353 |
| 2,883,527 | 5/1958 | Kohl et al. | 202/158 |
| 3,249,516 | 5/1966 | Mueller | 202/158 |
| 3,625,016 | 12/1971 | Hoffman | 62/34 |
| 3,685,967 | 8/1972 | Thayer | 423/580 |

Primary Examiner—Curtis R. Davis
Attorney, Agent, or Firm—Mortenson & Uebler

[57] ABSTRACT

A method and apparatus are disclosed relating to the recovery and reuse of heat during fractionation of liquids in a tray-type fractionating tower. According to this method, a portion of the feed to the tower is directed through heat exchange tubing positioned on the trays in such a way that the tubing is in contact with liquid there present so as to bring about an indirect exchange of heat between the said liquid on the trays and the liquid in the tubing, at the same time that there is occurring the normal transfer of heat by direct contact between the vapor and the liquid on the trays and the normal interchange of material components by direct contact between vapor and liquid on the trays, the said heat exchange tubing being serially connected so as to carry liquid from tray to tray.

3 Claims, 4 Drawing Figures

PROCESS AND APPARATUS FOR REDUCING THE ENERGY REQUIRED TO SEPARATE LIQUIDS BY DISTILLATION

CROSS-REFERENCE TO RELATED APPLICATION

This application is a continuation-in-part of my pending earlier application Ser. No. 960,577, filed Nov. 14, 1978 and now abandoned.

BACKGROUND OF THE INVENTION

The separation of volatile materials by continuous distillation in fractionating towers wherein vapor passes upward countercurrent to liquid flowing downward is and has been widely practiced in the chemical and petroleum industries. Heat is required to operate the process and it is important to recover and reuse as much of this heat as can be done economically.

For instance, referring to an article by Bannon and Marple, published in Chemical Engineering Progress, pp. 41-45, July 1978, (FIGS. 2, 3 and 4) it is seen that apparatus for separating petroleum hydrocarbons into fractions, either as they occur naturally or after they have been modified by cracking, may consist of a fractionating tower with external heat exchangers used to condense vapor leaving the top of the tower, and other external heat exchangers used to cool liquid withdrawn in one or more sidestreams from intermediate points in the tower. Each sidestream, after being cooled, is then recirculated back to the tower. The liquid crude petroleum that is to be separated into fractions is used as coolant in the said heat exchangers, being partially heated thereby, then passed through a furnace or vaporizer where it is partially or wholly vaporized, then passed into the fractionating tower at a point near the bottom. Fuel is burned to supply the required heat to the vaporizer. The more heat the feed stream of crude petroleum can be caused to take up by heat exchange with the vapor leaving the top of the tower and with the liquid withdrawn as sidestreams, the less fuel is required to heat the vaporizer.

Bannon and Marple point out that the conservation of heat is improved by carrying out heat exchange between the liquid feed of crude petroleum and the vapor leaving the top of the tower in two stages rather than in one. They also point out that the recovery of heat is improved by withdrawing, for heat exchange with the feed, several sidestreams rather than only one.

In principle it is possible to recover essentially all the heat required to bring the feed stream of crude petroleum up to its vaporization temperature but in practice the amount of heat recoverable is limited by the capital cost of the heat exchange apparatus including auxiliaries such as pumps, piping and control instruments. Thus it is apparent that, to recover heat economically, it is necessary not only to arrange the apparatus in such a way that the heat exchange takes place in multiple stages but also to minimize the cost of such apparatus.

Accordingly, it is an object of this invention to provide economic methods and apparatus improved over those available in the prior art for the recovery and reuse of heat needed to operate distillation processes.

SUMMARY OF THE INVENTION

The invention provides a method for reducing the amount of heat required to separate components of a liquid feed mixture having different boiling points in continuous fractional distillation, comprising preheating a portion of said mixture by passing it through heat exchange tubing located on at least a portion of the trays in a fractionating tower and positioned so that, when said tower is in operation, said tubes are covered by liquid in a state of agitation on said trays, said tubes being connected so as to carry said portion of said mixture over said trays downwardly in succession.

The feed mixture is one selected from the group consisting of crude petroleum, cracked petroleum fractions and petroleum-like mixtures produced synthetically from coal and from natural gas.

Also provided is apparatus for fractional distillation comprising:

a fractionating tower having a multiplicity of horizontal trays spaced at suitable vertical intervals within said tower for effecting countercurrent contact between vapor passing upward through the trays and liquid passing downward through the trays, feed and outlet means for introducing feed mixtures and withdrawing product, respectively, necessary auxiliaries as required for fractional distillation including piping and heater means, and at least one internal heat exchange circuit comprising heat exchange tubing positioned on the trays within the tower in such a way that it is covered by the violently agitated liquid that is present on the trays when the tower is in operation, serially connected from tray to tray and to the feed means, and associated piping so as to conduct a portion of the feed over the trays in succession downwardly, the tubing thereby providing means for transferring heat between the feed portion flowing within the tubing and the liquid on the trays outside the tubing.

The heat exchange tubing may be positioned in any suitable pattern on the trays but it must be close enough thereto to be covered by the agitated liquid thereon, providing sufficient heat transfer surface for heat exchange while at the same time leaving space between tubes for upward passage of vapor. The tubing on each tray can be installed as horizontal coils or as horizontal banks of straight tubes, in one or more layers as desired.

DETAILED DESCRIPTION OF THE INVENTION WITH REFERENCE TO THE DRAWINGS

Figure 1:
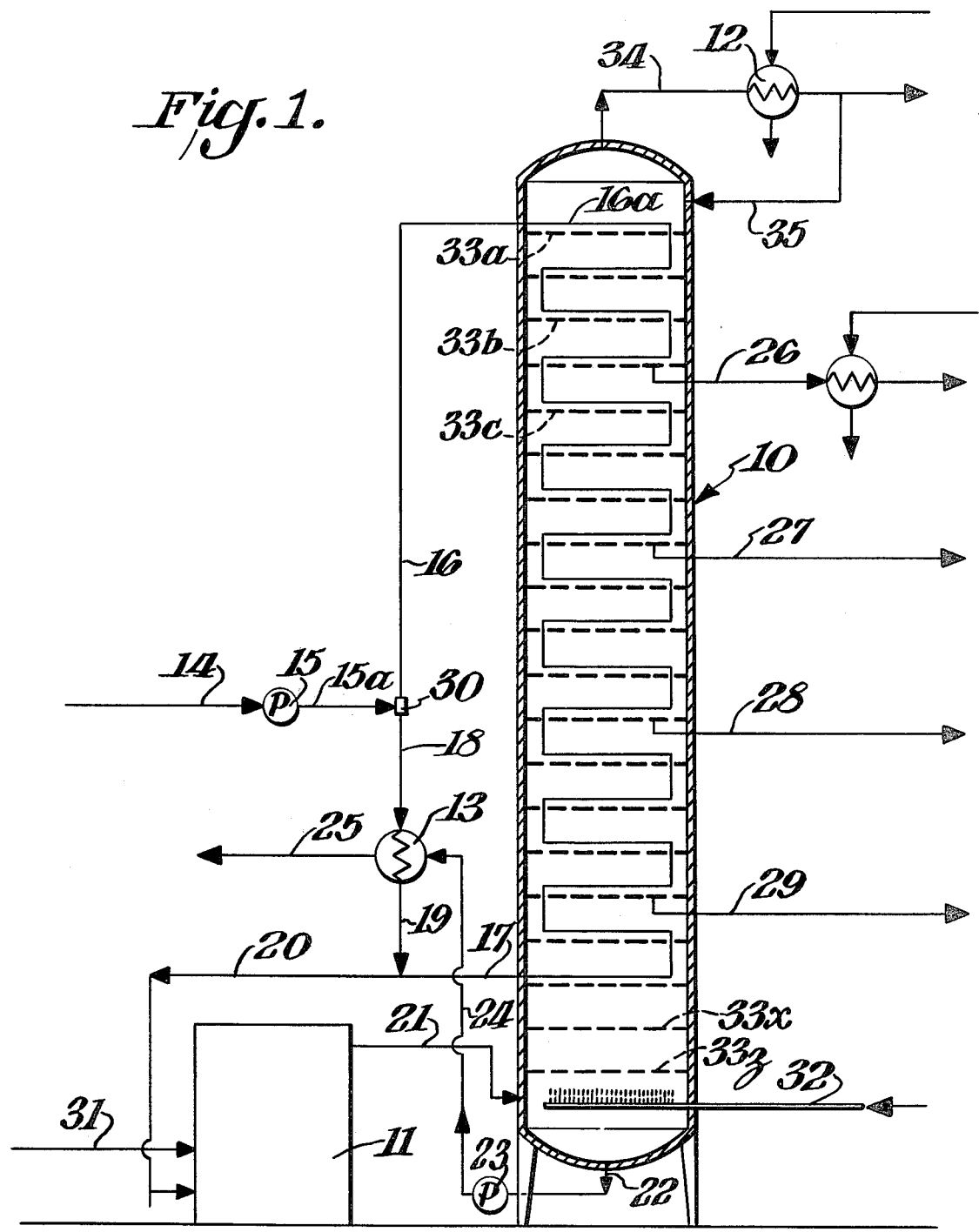
FIG. 1 shows schematically the apparatus of this invention.

According to a method of this invention, a continuously flowing stream of a feed mixture of liquid components that vaporize at different temperatures is continuously heated so as to vaporize part or all of the feed, the partially or wholly vaporized feed mixture being then continuously passed into a tray-type fractionating tower at a point near its bottom, the tower containing multiple horizontal trays of any suitable type, including but not limited to the "bubble-cap" and "sieve" types, the trays being spaced vertically at suitable intervals throughout the tower and being designed in the usual way to permit vapor to pass upward through the liquid while the liquid is passing downward, passing the vapor upward through the trays, continuously passing a portion of the liquid feed mixture through at least one heat exchange circuit comprising tubes positioned on each of a number of trays, installed in such a way that when the tower is operating the heat exchange tubes are covered with liquid, and being connected so as to conduct the portion of the feed mixture over the trays in succession, starting near the top of the tower and continuing downward through, or nearly through the tower. Initially, during startup of the apparatus, vapor condenses on the tubing and collects on the trays. As soon as enough has collected so that, in its agitated state, it covers the heat exchanger tubing, then and thereafter heat passes indirectly from said condensed liquid to the liquid flowing inside the tubing at the same time that heat is passing directly from the vapor to the condensed liquid on the trays, additional condensate being formed thereby and passing down the tower in the usual way. Any vapor that reaches the top of the tower uncondensed is passed through air-cooled or water-cooled condensers external to the tower, and one or more sidestreams are withdrawn as products from intermediate points in the tower. Thus vapor and liquid pass countercurrent through the tower in direct contact, as in the prior art, so that a transfer of material components takes place between them, components having higher boiling points tending to go to the liquid and those of lower boiling points to the vapor, while heat is exchanged between said liquid and vapor by direct contact, while at the same time heat is exchanged indirectly between the liquid feed mixture flowing in the heat exchange tubing and liquid accumulating and flowing on the trays outside the tubing, the indirect transfer of heat from the liquid on the trays to the liquid flowing through the heat exchange tubing installed on the trays being a feature not used in distillation according to the known prior art.

The advantages of this method are many and include:

A. External heat exchangers are wholly or partially eliminated.

B. Pumps, piping and flow-control instrumentation required to recirculate liquid through external heat exchangers are wholly or partially eliminated.

C. The indirect transfer of heat is more rapid with heat exchange tubing installed on the trays as described because the liquid on the trays is violently agitated by the gas passing upward through the trays.

D. The provision of heat exchange tubing on a large number of trays in the fractionating tower makes each tray so provided an individual condenser and thereby improves heat recovery because heat is exchanged in many more stages (internally) than can be economically provided when using external exchangers. This reduces the amount of makeup heat that needs to be supplied to the heater or vaporizer, such makeup heat being an important item of operating cost, and also makes possible the use of a smaller heater, thereby saving capital cost.

E. The installation of heat exchange tubes on the trays of the fractionating tower eliminates the need for the external shells or vessels normally used to contain such tubes and thereby reduces the installed cost of such tubes.

F. All trays in the tower work at substantially maximum efficiency for fractionating the feed mixture. In systems used in the prior art, whereby reflux liquid is withdrawn from the tower, cooled externally and then returned to the tower, the trays between which the reflux liquid flows between the point of return and the point of withdrawal do not work at maximum efficiency because the recycle of liquid partially counteracts the fractionation that otherwise occurs on each tray.

An important feature of the present invention is the provision for the simultaneous transfer of heat and of material components on the trays of a fractionating tower by positioning heat exchange tubes in such a way that when the tower is operating the tubes are covered by liquid that is in violent motion. The rate of heat transfer from such liquid in violent motion caused by the passage of vapor through it is more than twice the maximum that can be achieved in conventional shell-and-tube exchangers, or by "drip coolers" in which vapor contacts the tubes to yield condensate that then drips from the tubes. As many as three layers of tubes can be positioned on the trays as described without requiring any additional spacing between trays and therefore without requiring any additional height in the tower, and without reducing the capacity of the trays to perform their normal function which is the direct contacting of vapor and liquid.

The essential elements of a conventional process for the continuous separation of a mixture of liquid components into several fractions by continuous distillation are (a) a fractionating tower containing trays or packing; (b) a heated vaporizer; and (c) a cooled condenser. The feed mixture is passed through the vaporizer where it is partially or wholly vaporized, then passed into the tower near the bottom thereof. The vapor passes upward through the tower and into the condenser where it condenses to a liquid, part of which liquid (the reflux) is returned to the top of the tower while the remainder is withdrawn as "top product." The reflux passes down through the tower counter-current to and in direct contact with vapor passing upward and in so doing exchanges material components with the vapor, the lower boiling components tending to go upward with the vapor and the higher boiling ones tending to go downward with the liquid. Thus there is established a temperature gradient increasing from top to bottom of the tower and also a concentration gradient with mostly low boiling components present at the top of the tower, mostly intermediate boiling components present in intermediate sections of the tower and mostly higher boiling components present in sections near the bottom of the tower, while a residue of materials having the highest boiling points collects in the base of the tower. Product fractions having various average boiling points can be withdrawn continuously from points intermediate in the tower, and the residue of highest boiling materials is withdrawn from the bottom of the tower.

The conventional continuous fractional distillation process as above summarized has been described in various articles and textbooks including the previously cited article by Bannon and Marple, and the section on distillation in the Handbook of Chemical Engineering, edited by J. H. Perry, Second Edition, 1941. The process can be used to separate into fractions any mixture of liquid components having different boiling points and is universally used to separate petroleum oil into various desired fractions.

In one embodiment of this invention, shown in FIG. 1 a mixture of materials such as those contained in petroleum, in cracked petroleum fractions, or in petroleum-like mixtures made from coal or from natural gas, is continuously separated into fractions using a vessel 10, commonly called a fractionating tower. Tower 10 contains a number of trays 33, spaced at suitable vertical intervals throughout the tower. These trays, which may be either "sieve-type" or "bubble-cap" type are designed in the usual way, as described for instance in the Handbook of Chemical Engineering, previously cited, to allow liquid to flow downward countercurrent to vapor flowing upward, vapor and liquid being then successively contacted on each tray.

In the embodiment of the present invention here shown the feed mixture passes continuously from storage via pipe 14 to pump 15 then via pipe 15a to a junction 30 where it is divided into two portions. One portion passes via pipe 16 into tower 10 at a point near the top of said tower at which point it enters heat exchange circuit 16a. The other portion passes via pipe 18 to heat exchanger 13. The further processing of this other portion will be described later.

Returning now to that portion of the feed mixture that has passed through pipe 16 and then to heat exchange circuit 16a, it will be seen that circuit 16a is arranged so as to conduct the feed mixture over the top of tray 33a then down to the next tray below, 33b, then over tray 33b, then down to and over tray 33c and so on down the tower to a tray 33x near the bottom, at which point it leaves the tower 10 and enters pipe 17, then passes via pipe 20 to furnace or heater 11. Heater 11 is normally oil-fired but may be heated by use of any suitable fuel. In heater 11 the liquid feed mixture is heated sufficiently so that it becomes partially or wholly vaporized. The mixture then passes via pipe 21 to a point in the tower 10 below the bottom tray 33z, the vapor portion then passing upward through all the trays 33 in succession. In so passing upward, it comes into direct contact with the liquid on the trays, which liquid is in contact with the tubing of heat exchange circuit 16a which is located on tray 33x and on all trays above tray 33x. A portion of the liquid feed mixture is passing downward through the tower 10 within heat exchange circuit 16a, as previously described, and this liquid, having come from storage, is at a lower temperature than the vapor that has come from heater 11 and is passing up the tower and also at a lower temperature than the liquid on the trays, the latter being at a temperature intermediate between that of the vapor and that of the liquid inside the heat exchange tubing. Therefore the liquid flowing in heat exchange circuit 16a tends to cool the liquid that is on the trays which liquid in turn tends to cool the vapor that has come from heater 11 and is passing upward in the tower. As a consequence, some of the upward moving vapor condenses and in so doing gives up heat to the liquid on the trays which in turn gives up heat to the liquid flowing downward in heat exchange circuit 16a. Components of the vapor having higher boiling points tend to condense in the lower part of tower 10 and those having lower boiling points tend to condense in the upper part of tower 10. Liquid thus formed by condensation flows downward over the heat exchange circuits and across and through the trays, countercurrent to and in direct contact with vapor flowing upward. During this direct contact between vapor and liquid, material components of the mixture are exchanged between them, lower boiling components tending to pass from the liquid into the vapor and higher boiling components tending to pass from the vapor into the liquid.

Most if not all of the vapor entering the bottom of tower 10 and thereafter passing upward is condensed in the tower as described but it may be convenient to allow some of it to pass out the top of the tower through vapor pipe 34 to condenser 12 which is of conventional design. Vapor so passing to condenser 12 is condensed to liquid and part or all of this liquid is then being returned via pipe 35 to a point in the tower above the top tray 33a. "Top product" so withdrawn will have the lowest average boiling point of any of the product fractions. In the embodiment shown in the drawing, a "light fraction" is being withdrawn through pipe 26 from a point approximately one-quarter of the way down from the top of the tower, an intermediate fraction is withdrawn through pipe 27 from a point about half way down the tower, a "heavy fraction" is withdrawn through pipe 28 from a point about three-quarters of the way down the tower, and an "extra heavy fraction" is withdrawn through pipe 29 from a point near the bottom of the tower.

In accordance with usual practice in distilling petroleum, a small amount of superheated steam can be injected into tower 10 via pipe 32 below tray 33z in order to strip out and carry upward small amounts of low boiling components that otherwise would remain in the high boiling components present on the bottom trays of tower 10.

A residue containing the highest boiling components of the original feed mixture flows to the bottom of tower 10, passes through pipe 22 to pump 23 and thence to heat exchanger 13, previously described, where it is cooled in giving up heat to that portion of the original feed mixture that has come to heat exchanger 13 through pipe 18 as previously described. The last named portion of the feed mixture becomes heated in passing through exchanger 13, then passes through pipe 19 and joins the rest of the feed mixture, which is passing through pipe 20, the total of the feed mixture then passing to heater 11.

Figure 2:
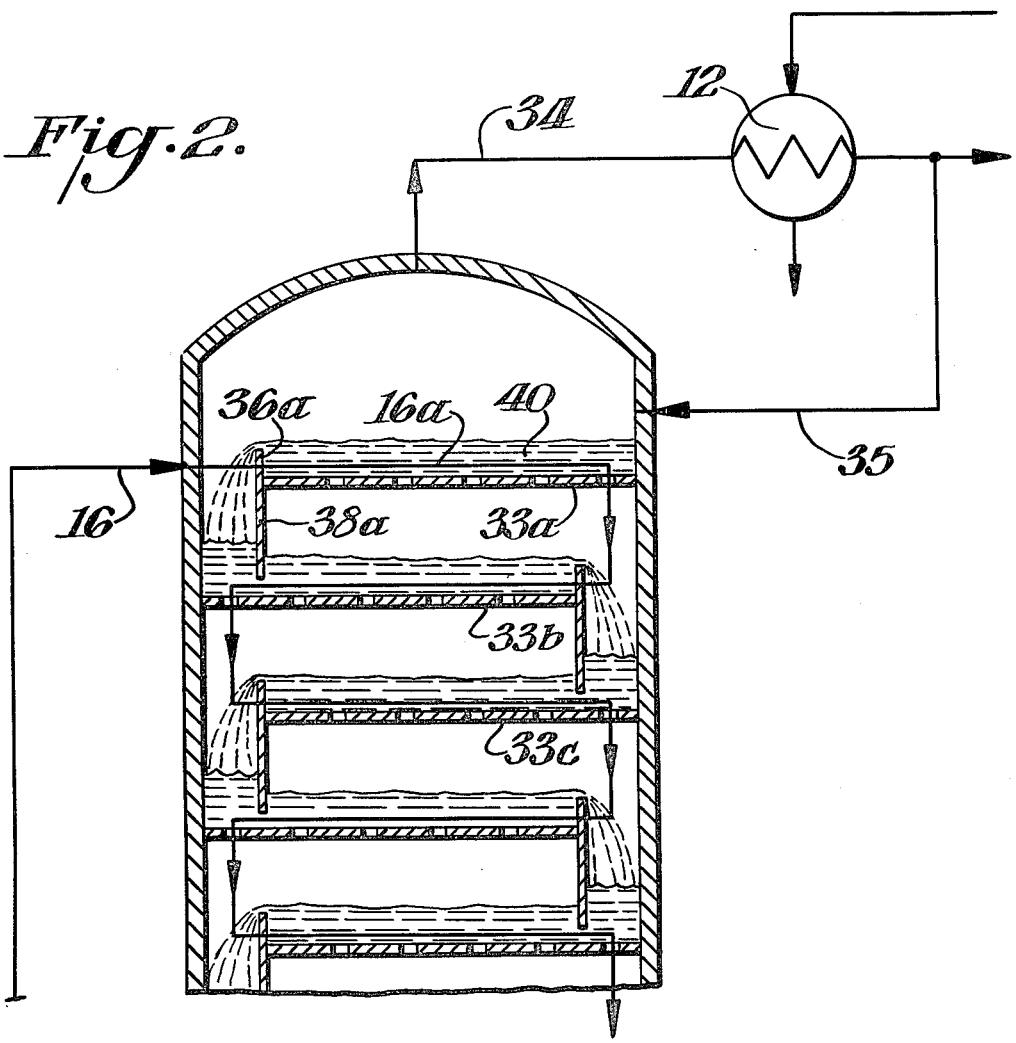
FIG. 2 shows a detailed cross-sectional view of a portion of the distillation tower, trays and heat exchange circuit of this invention.

FIG. 2 shows, in detailed cross-sectional view, the upper portion of tower 10 containing conventional trays 33a, 33b, etc., and wier assemblies 36a, 36b, etc. and downcomers 38a, 38b, etc., as well as vapor pipe 34 and condenser 12. The heat exchange tubing 16a is shown positioned on the trays and within the violently agitated liquid 40 on the trays such that the tubes are covered by the liquid, thereby effecting heat exchange indirectly between the condensed liquid on the trays and the liquid flowing within the tube 16a.

Capital cost of the heat recovery apparatus according to this invention is reduced by having the feed mixture heated by passing through heat exchange tubes located within the fractionating tower, as described. A further saving in capital cost can be achieved, if desired, by passing the residual material from the bottom of tower 10 upward through said tower in a heat exchange circuit similar to and paralleling circuit 16a, thereby eliminating the need for the external exchanger 13. In this case, all of the feed mixture to be processed is passed through circuit 16a.

From the above description it is apparent that the feed mixture passing through circuit 16a is being heated during its passage downward through tower 10. Because of the multiplicity of trays over which circuit 16a passes, each tray that includes a portion of circuit 16a acts as a separate condenser and the quantity of heat thus recovered by the feed mixture is substantially greater than that recovered by means that can be economically provided according to the prior art and in consequence the heat needed to be supplied by burning fuel in heater 11 is minimized.

The novel and advantageous features of this invention will be apparent when comparing the process and apparatus shown schematically in FIG. 1 with that shown in U.S. Pat. Nos. 2,183,094 (Fenske et al) and 3,625,016 (Hoffman) and then with an example of the published current art, specifically that shown in FIGS. 2, 3 and 4 of the article by Bannon and Marple (Chemical Engineering progress, Vol. 74, p. 41, 1978) previously cited.

Fenske et al. show (FIG. 1) heat exchange tubing placed inside a fractionating tower in sections, with two trays located below each section. With this arrangement the tubes are not located within the liquid on the trays. Liquid will condense from the vapor onto the tubes and drip off, but such dripping does not substantially enhance the rate of heat transfer, which with this arrangement is about the same as that achieved in conventional shell-and-tube condensers. A further disadvantage of the arrangement shown by Fenske et al. is that additional height is required in the tower to accommodate the heat exchange tubes. With the present invention, on the other hand, no additional height beyond that required to accommodate the trays is required to accommodate the heat exchange tubing.

Hoffman discloses apparatus for the liquefaction of gases and separation of their components by distillation in a fractionating column in which heat exchangers are shown schematically between trays. However, Hoffman does not suggest exchange tubing positioned within the liquid on the trays.

Considering now the current art as exemplified for instance by the article of Bannon and Marple, previously cited, it will be seen that the five stages of heat exchange are employed between the feed mixture and various process streams, there being two stages of overheat condensation and three stages of sidestream cooling. According to the present invention, by comparison, as shown schematically in FIG. 1., the stages of external heat recovery are eliminated, their place being taken by heat exchange circuit 16a which is inside tower 10. The arrangement shown in FIG. 1 is a marked simplification of the heat exchange apparatus compared to that shown for a similar purpose in the current art, this simplification being achieved without adding any height or breadth to the fractionating tower. This simplification makes possible a large saving in capital cost of the apparatus. For instance, a typical large scale fractionating tower and auxiliaries such as that referred to by Bannon and Marple may cost about $15 million whereas an apparatus capable of processing the same amount of feed mixture while being built in accordance with the present invention is estimated to cost about $9 million. This reduction in cost reflects the elimination of five stages of external heat exchangers together with piping, pumps and control instrumentation required to operate such exchangers located externally from the fractionating tower, said external apparatus having been replaced by the internal heat exchange tubing that constitutes circuit 16a.

Another advantage of the present invention is that each tray of tower 10 on which a portion of the tubing constituting conduit 16a is located functions as an individual condenser. Thus in a typical apparatus fractionating crude petroleum there may be of the order of 50 to 60 trays in a tower such as tower 10, and according to the present invention most of them have on them a part of heat exchange circuit 16a. Each of these trays then functions not only to bring liquid and vapor together in direct contact as in the prior art but also functions as an individual heat exchanger to recover process heat by indirect heat exchange between the feed mixture passing within conduit 16a and the liquid outside of circuit 16a. Thus the present invention achieves heat recovery in a multiplicity of stages, about 45 to 55 in a typical case, whereas Bannon and Marple recommend five or six stages as being about the maximum that are economically practical using means available in the prior art. This multiplicity of stages for heat recovery, which is an important advantage of the present invention, makes possible the recovery of substantially more heat than can be recovered economically according to the prior art. For instance, in a typical case involving operation of a large fractionating tower such as that described by Bannon and Marple, the saving in fuel achieved by the present invention, assuming that crude petroleum is worth about $10 per barrel, should be of the order of $3 million per year, while at the same time the cost of the apparatus will be substantially less, as previously noted. This ability to achieve a saving in fuel while at the same time achieving a saving in capital cost further illustrates the novelty and usefulness of this invention since ordinarily one would expect to have to expend capital in order to save fuel.

It will be obvious to one skilled in the art that various modifications may be made in the apparatus and the manner of operating it. For instance, although the tray to tray connections between the heat exchange tubes of circuit 16a are shown in FIG. 1 as being inside the tower 10, they can, alternatively, be located outside the tower by providing suitable ports through the tower at each tray. Another modification might be to vary the amount of heat exchange surface installed on individual trays according to the amount of heat it is desired to extract on individual trays. Another modification might involve the passage of the feed mixture through more than one circuit such as 16a in order to vary the amount of heat extracted in different sections of the tower 10. Another modification might be to arrange the conduit 16a in sections so that liquid passing therein could be removed from an intermediate point on the side of tower 10, treated for removal of a brine layer ("desalting," so called) and then returned to continue its passage through the tower. Other modifications may involve using additional heat exchange circuits inside the tower, on the trays as described, to recover heat not only from the residue fraction as previously mentioned, but also from the sidestream fractions, the choice here depending upon the relative amounts of the various fractions being withdrawn and the disposition that is being made of them after they have been withdrawn. It is intended to cover such modifications and changes as would occur to those skilled in the art, so far as the following claims permit and so far as is consistent with the state of the prior art.

I claim:

1. A method for reducing the amount of heat required to separate components of a liquid petroleum feed mixture, said components having different boiling points, in continuous fractional distillation, comprising preheating a portion of said feed mixture by passing it through heat exchange tubing located on at least a portion of the trays in a fractionating tower and positioned so that, when said tower is in operation, said tubes are covered by liquid in a state of agitation on said trays, said tubes being connected so as to carry said portion of said mixture over said trays downwardly in succession, and then feeding said portion of said feed mixture into said tower, fractionating said feed in said tower, and recovering overhead and bottoms products therefrom.

2. The method of claim 1 wherein said feed mixture is one selected from the group consisting of natural petroleum, cracked petroleum fractions and petroleum-like oil mixtures produced synthetically from coal and from natural gas.

3. Apparatus for fractional distillation of petroleum comprising:
   a fractionating tower having a multiplicity of horizontal trays spaced at suitable vertical intervals within said tower for effecting countercurrent contact between vapor passing upward through the trays and liquid passing downward through the trays,
   feed and outlet means for introducing feed mixtures and withdrawing overhead and bottoms products, respectively,
   necessary auxiliaries as required for fractional distillation including piping and heater means, and
   at least one internal heat exchange circuit comprising heat exchange tubing located on at least a portion of said trays within the tower and positioned such that, when the tower is in operation, said tubing is covered by agitated liquid present on the trays, said tubing being serially connected from tray to tray and to said feed means, and associated piping so as to receive and conduct a portion of the feed over said trays in succession downwardly, the tubing thereby providing means for transferring heat between the feed portion flowing within the tubing and the liquid flowing within the tower on the trays outside the tubing, and means for feeding said preheated portion of said feed into said tower for fractionation.

* * * * *